(12) United States Patent
Nakashio et al.

(10) Patent No.: US 11,531,855 B2
(45) Date of Patent: Dec. 20, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Hidekazu Nakashio, Saitama (JP); Yukihiro Shindo, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/578,800

(22) Filed: Jan. 19, 2022

(65) Prior Publication Data
US 2022/0230030 A1 Jul. 21, 2022

(30) Foreign Application Priority Data
Jan. 21, 2021 (JP) .............................. JP2021-008033

(51) Int. Cl.
G06K 15/02 (2006.01)
(52) U.S. Cl.
CPC ..... G06K 15/1878 (2013.01); G06K 15/1882 (2013.01)
(58) Field of Classification Search
CPC ..................... G06K 15/1878; G06K 15/1882
See application file for complete search history.

(56) References Cited

U.S. PATENT DOCUMENTS 7,199,900 B2 * 4/2007 Ogatsu ................ B41F 27/1206
358/1.9
8,559,078 B2 * 10/2013 Shibuya ............. G03G 15/0131
358/1.14

FOREIGN PATENT DOCUMENTS

JP 2004153667 A 5/2004
JP 2015149525 A 8/2015

* cited by examiner

*Primary Examiner* — Quang N Vo
(74) *Attorney, Agent, or Firm* — Rossi, Kimms & McDowell LLP

(57) ABSTRACT

It is made possible to perform appropriate color matching between devices irrespective of whether a printed material is print-output in color or monochrome from a destination device. The color characteristic of the destination device is obtained by printing a chart in which a predetermined density pattern is formed in the destination device and reading the color of the chart. Next, whether the chart output from the destination device is color or monochrome is determined. Then, color conversion parameters for reproducing the color characteristic of the destination device in an adjustment device are determined by printing the color chart in a case where the printed material is determined that formed in color or printing the monochrome chart in a case where the printed material is determined that formed in monochrome in the adjustment device.

11 Claims, 11 Drawing Sheets

FIG.7A

PATCH RGB VALUES

| | R | G | B |
|---|---|---|---|
| 1 | 0 | 0 | 0 |
| 2 | 0 | 0 | 32 |
| 3 | 0 | 0 | 64 |
| 4 | 0 | 0 | 96 |
| 5 | 0 | 0 | 128 |
| ... | | | |
| 721 | 255 | 255 | 0 |
| 722 | 255 | 255 | 32 |
| 723 | 255 | 255 | 64 |
| 724 | 255 | 255 | 96 |
| 725 | 255 | 255 | 128 |
| 726 | 255 | 255 | 160 |
| 727 | 255 | 255 | 192 |
| 728 | 255 | 255 | 224 |
| 729 | 255 | 255 | 255 |

FIG.7B

SCANNED RGB VALUES

| | R | G | B |
|---|---|---|---|
| 1 | 0 | 0 | 0 |
| 2 | 0 | 0 | 4 |
| 3 | 0 | 0 | 5 |
| 4 | 0 | 0 | 8 |
| 5 | 0 | 0 | 15 |
| ... | | | |
| 721 | 255 | 255 | 0 |
| 722 | 255 | 255 | 11 |
| 723 | 255 | 255 | 24 |
| 724 | 255 | 255 | 55 |
| 725 | 255 | 255 | 99 |
| 726 | 255 | 255 | 144 |
| 727 | 255 | 255 | 185 |
| 728 | 255 | 255 | 216 |
| 729 | 255 | 255 | 255 |

FIG.7C

COLOR CHARACTERISTIC

| | L* | a* | b* |
|---|---|---|---|
| 1 | 16.68 | -0.02 | 0.01 |
| 2 | 17.09 | 2.79 | -4.48 |
| 3 | 17.86 | 4.69 | -10.09 |
| 4 | 18.36 | 6.87 | -15.95 |
| 5 | 18.81 | 9.46 | -21.09 |
| ... | | | |
| 721 | 88.33 | -6.64 | 88.44 |
| 722 | 88.86 | -7.30 | 78.13 |
| 723 | 89.24 | -7.59 | 65.79 |
| 724 | 89.81 | -7.28 | 55.15 |
| 725 | 90.38 | -6.55 | 44.60 |
| 726 | 90.84 | -5.27 | 32.52 |
| 727 | 91.34 | -3.62 | 20.94 |
| 728 | 91.78 | -1.80 | 10.22 |
| 729 | 92.49 | 0.17 | 1.12 |

FIG.7D

SCANNED RGB VALUES

| | R | G | B |
|---|---|---|---|
| 1 | 0 | 0 | 0 |
| 2 | 4 | 4 | 4 |
| 3 | 5 | 5 | 5 |
| 4 | 7 | 8 | 8 |
| 5 | 15 | 15 | 15 |
| ... | | | |
| 721 | 5 | 5 | 5 |
| 722 | 11 | 11 | 11 |
| 723 | 24 | 24 | 24 |
| 724 | 55 | 55 | 55 |
| 725 | 99 | 99 | 99 |
| 726 | 144 | 144 | 144 |
| 727 | 185 | 185 | 185 |
| 728 | 216 | 216 | 216 |
| 729 | 255 | 255 | 255 |

FIG.7E

COLOR CHARACTERISTIC

| | L* | a* | b* |
|---|---|---|---|
| 1 | 16.68 | -0.02 | 0.01 |
| 2 | 17.09 | 0.79 | -0.48 |
| 3 | 17.86 | 0.99 | -0.09 |
| 4 | 18.36 | 0.87 | -0.95 |
| 5 | 18.81 | 0.46 | -0.09 |
| ... | | | |
| 721 | 17.86 | -0.64 | 0.44 |
| 722 | 22.86 | -0.30 | 0.13 |
| 723 | 29.24 | -0.59 | 0.79 |
| 724 | 42.81 | -0.28 | 0.15 |
| 725 | 49.38 | -0.55 | 0.60 |
| 726 | 60.84 | -0.27 | 0.52 |
| 727 | 71.34 | -0.62 | 0.94 |
| 728 | 81.78 | -0.80 | 0.22 |
| 729 | 92.49 | 0.17 | 0.12 |

FIG.8A

PATCH RGB VALUES

| | R | G | B |
|---|---|---|---|
| 1 | 0 | 0 | 0 |
| 2 | 1 | 1 | 1 |
| 3 | 2 | 2 | 2 |
| 4 | 3 | 3 | 3 |
| 5 | 4 | 4 | 4 |
| ... | | | |
| 247 | 247 | 247 | 247 |
| 248 | 248 | 248 | 248 |
| 249 | 249 | 249 | 249 |
| 250 | 250 | 250 | 250 |
| 251 | 251 | 251 | 251 |
| 252 | 252 | 252 | 252 |
| 253 | 253 | 253 | 253 |
| 254 | 254 | 254 | 254 |
| 255 | 255 | 255 | 255 |

FIG.8B

SCANNED RGB VALUES

| | R | G | B |
|---|---|---|---|
| 1 | 0 | 0 | 0 |
| 2 | 2 | 2 | 2 |
| 3 | 4 | 5 | 5 |
| 4 | 5 | 5 | 6 |
| 5 | 7 | 7 | 7 |
| ... | | | |
| 247 | 244 | 244 | 244 |
| 248 | 247 | 247 | 248 |
| 249 | 248 | 249 | 249 |
| 250 | 250 | 250 | 250 |
| 251 | 252 | 252 | 253 |
| 252 | 252 | 253 | 253 |
| 253 | 253 | 253 | 253 |
| 254 | 254 | 254 | 254 |
| 255 | 255 | 255 | 255 |

FIG.8C

COLOR CHARACTERISTIC

| | L* | a* | b* |
|---|---|---|---|
| 1 | 16.68 | -0.02 | 0.01 |
| 2 | 17.09 | -0.02 | 0.01 |
| 3 | 17.86 | -0.02 | 0.01 |
| 4 | 18.36 | -0.02 | 0.01 |
| 5 | 18.81 | -0.02 | 0.01 |
| ... | | | |
| 247 | 85.86 | -0.02 | 0.01 |
| 248 | 86.86 | -0.02 | 0.01 |
| 249 | 87.24 | -0.02 | 0.01 |
| 250 | 88.81 | -0.02 | 0.01 |
| 251 | 89.38 | -0.02 | 0.01 |
| 252 | 90.84 | -0.02 | 0.01 |
| 253 | 91.34 | -0.02 | 0.01 |
| 254 | 91.78 | -0.02 | 0.01 |
| 255 | 92.49 | -0.02 | 0.01 |

IMAGE PROCESSING APPARATUS, IMAGE PROCESSING METHOD, AND STORAGE MEDIUM

BACKGROUND

Field

The technique of the present disclosure relates to a color adjustment technique in a printer that prints digital image data.

Description of the Related Art

In a case where an image forming apparatus capable of so-called full-color printing is replaced with another, or in a case where a new image forming apparatus is purchased, there is a demand to keep the tint of a printed material before the replacement or by the existing image forming apparatus also in the replaced or purchased image forming apparatus. Here, the printing device that is the destination, such as the image forming apparatus before the replacement and the existing image forming apparatus, is called "destination device" and the printing device that is adjusted, such as the replaced image forming apparatus and the newly purchased image forming apparatus, is called "adjustment device". Then, conventionally, a technique has been proposed that matches the tint of a printed material between different devices by adjusting the color profile. For example, Japanese Patent Laid-Open No. 2004-153667 has disclosed a color proof system that matches the tint of a printed material of an inexpensive color printer as an adjustment device with the tint of a printed material by a large-size proofreading apparatus as a destination device.

In a case where color matching is performed between the above-described different devices, first, the color characteristic of the destination device is obtained by reading the printed material that is output from the destination device. Here, conventionally, it is premised that the printed material is print-output from the destination device in one of color and monochrome, and therefore, it is difficult to perform appropriate color matching between devices in a case where the printed material is print-output both in color and in monochrome.

SUMMARY

The image processing apparatus according to the present disclosure includes: a first determination unit configured to determine, based on reading results of a color of a printed material in which a predetermined density pattern is formed by a first image forming apparatus, whether the printed material is formed in color or monochrome; and a second determination unit configured to determine, based on a color characteristic of the first image forming apparatus derived based on the reading results and a color characteristic of a second image forming apparatus, color conversion parameters for reproducing the color characteristic of the first image forming apparatus in the second image forming apparatus, wherein the second determination unit determines the color conversion parameters for color printing in a case where the printed material is determined that formed in color by the first determination unit or determines the color conversion parameters for monochrome printing in a case where the printed material is determined that formed in monochrome by the first determination unit.

Further features of the present disclosure will become apparent from the following description of exemplary embodiments with reference to the attached drawings.

BRIEF DESCRIPTION OF THE DRAWINGS

FIG. 7A to FIG. 7E are diagrams explaining obtaining of a color characteristic based on a color chart image;

FIG. 8A to FIG. 8C are diagrams explaining obtaining of a color characteristic of a monochrome chart image;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

System Configuration

Figure 1:
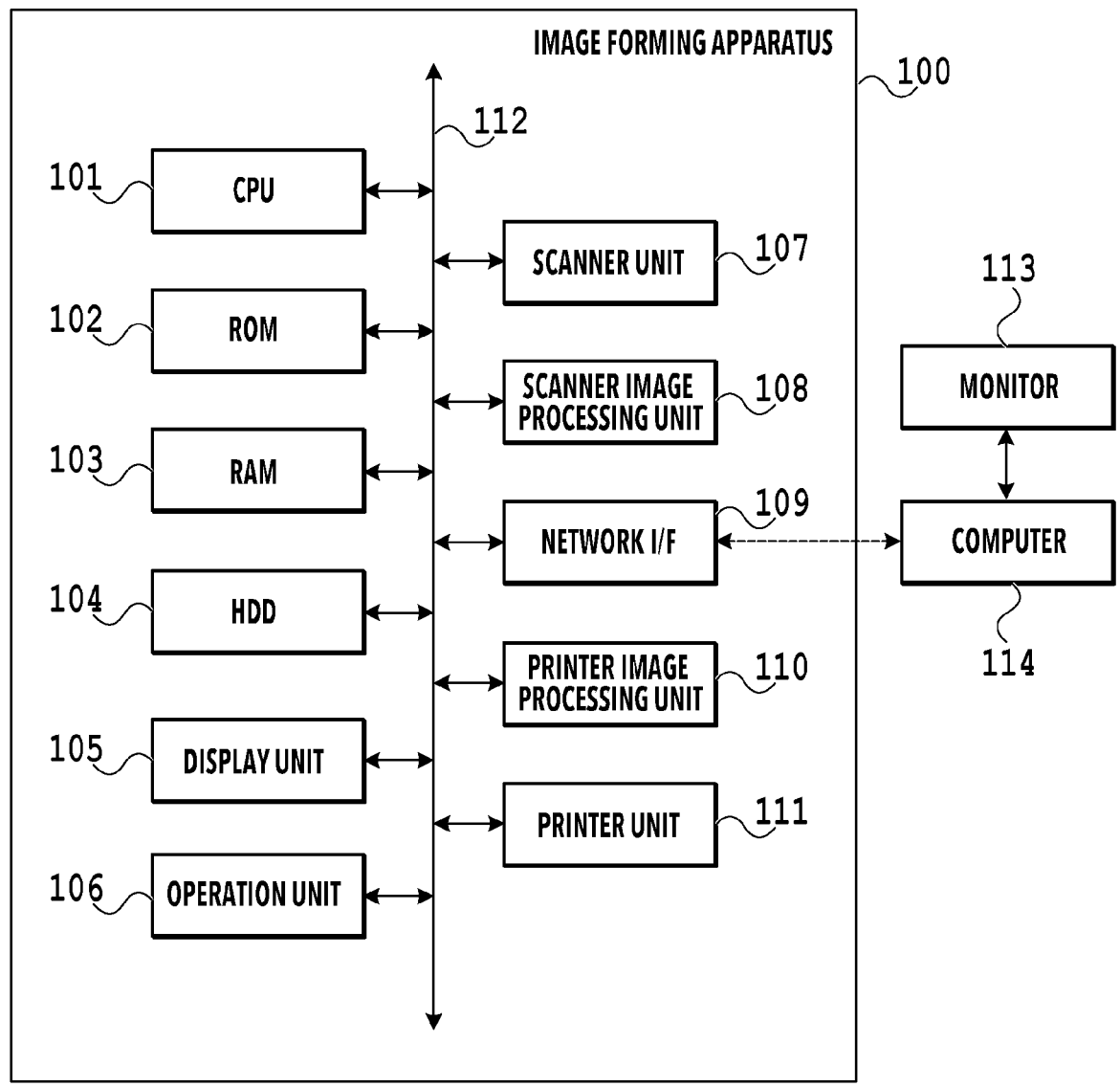
FIG. 1 is a block diagram showing a configuration of a printing system.

FIG. 1 is a block diagram showing the configuration of a printing system according to an embodiment of the present invention and the printing system includes an image forming apparatus 100 and a computer 114 and to the computer 114, a monitor 113 is connected. The image forming apparatus 100 is a printing apparatus capable of color printing and monochrome printing in the electrophotographic method, for example, such as a digital copy machine, a laser printer separately equipped with a scanner, and a facsimile. The image forming apparatus 100 comprises a CPU 101, a ROM 102, a RAM 103, an HDD 104, a display unit 105, an operation unit 106, a scanner unit 107, a scanner image processing unit 108, a network I/F 109, a printer image processing unit 110, and a printer unit 111.

To explain each configuration of the image forming apparatus 100 in detail, the CPU 101 is a central processing unit configured to perform control of the entire apparatus, arithmetic processing and the like and performs each piece of image processing, to be described later, based on programs stored in the ROM 102. The ROM 102 is a read-only memory and used as a storage area of a system activation program, programs performing control of the scanner unit 107 and the printer unit 111, character data, character code information and the like. The RAM 103 is a random access memory and made use of at the time of programs and data stored in the ROM 102 being loaded and executed by the CPU 101 for each of a variety of pieces of processing. Further, the RAM 103 is made use of as a storage area of image data received from the scanner unit 107 and the network I/F 109. The HDD 104 includes, for example, a hard disk and the like and is made use of for storage of results of processing performed by the CPU 101, programs, each information file, printing-target image data and the like. Further, the HDD 104 is also made use of as a work area at the time of the CPU 101 performing processing. The display unit 105 displays a screen with, for example, a liquid crystal or the like, and is used to display the setting state of the apparatus, the processing of each unit of the apparatus, such as the CPU 101, the error state and the like. The operation unit 106 is a portion with which a user inputs various instructions to change, reset, and so on various settings. Information on various instructions input via the operation unit 106 is stored in the RAM 103 and used at the time the CPU 101 performing processing. The scanner unit 107 irradiates a document that is set on a document table or the like, not shown schematically with light, converts the reflected light into an electric signal with a CCD equipped with color filters of RGB, and obtains image data (scanned image data) in the RGB color space corresponding to the document. The scanner image processing unit 108 performs image processing, such as shading processing, for scanned image data. The network I/F 109 connects the image forming apparatus 100 to a network, such as an intranet. Via this network I/F 109, a print job is input to the image forming apparatus 100 from the computer 114 over the network. The print job includes header information specifying printing conditions, such as color/monochrome and the sheet size, and PDL data specifying a printing-target image for each page. PDL is an abbreviation of "Page Description Language" and refers to a language for describing an output image to the printer at the time of printing a sentence, an image and the like created on the computer. As a representative language, mention is made of PostScript of Adobe System. The printer image processing unit 110 generates print data for the printer unit 111 by performing predetermined image processing for image data processed in the scanner image processing unit 108 or image data obtained by interpreting PDL within the print job received from the computer 114. The printer unit 111 forms an image on a paper medium by performing each electrophotographic process of exposure, latent image formation, development, transfer, and fixing for the print data of each color plane (here, cyan, magenta, yellow, black) corresponding to color materials, which has been processed in the printer image processing unit 110. The system bus 112 connects the above-described components and serves as a data path between each component.

The computer 114 is a host apparatus of the image forming apparatus 100. That is, a user gives printing instructions by generating a print job for the printer unit 111 to perform printing of an image or the like that is displayed on the monitor 113 via the computer 114 and inputting the print job to the image forming apparatus 100.

It may also be possible to configure part of the components of each of the units described above configuring the image forming apparatus 100 as an apparatus independent of the image forming apparatus 100.

Printer Image Processing Unit

Figure 2:
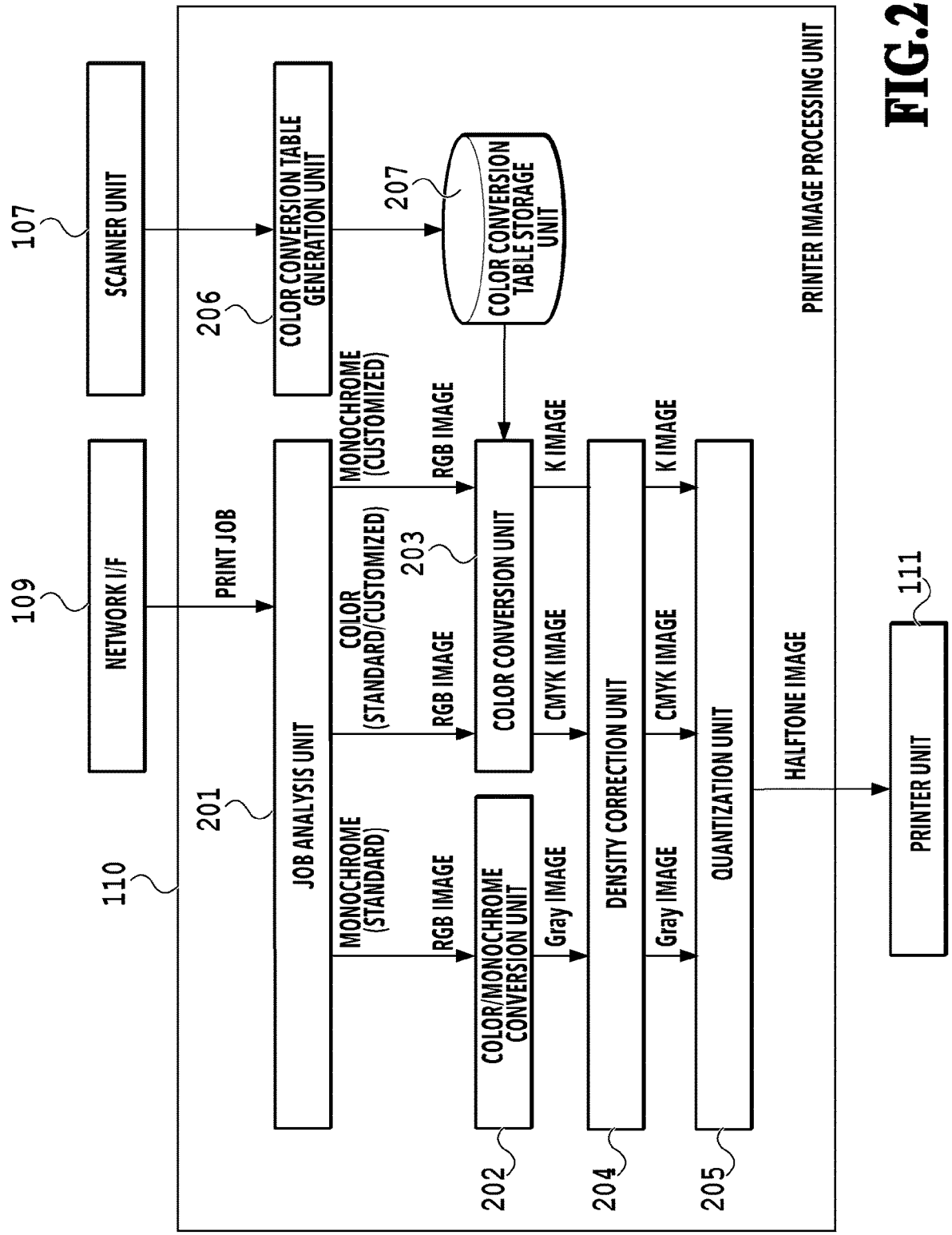
FIG. 2 is a block diagram explaining an internal configuration of a printer image processing unit.

FIG. 2 is a block diagram explaining the internal configuration of the printer image processing unit 110. The printer image processing unit 110 comprises a job analysis unit 201, a color/monochrome conversion unit 202, a color conversion unit 203, a density correction unit 204, a quantization unit 205, a color conversion table generation unit 206, and a color conversion table storage unit 207. Each of these units is implemented by the CPU 101 reading a program stored in the ROM 102 onto the RAM 103 and executing the program. Alternatively, part or all of these units may be implemented by hardware, such as an ASIC or an electronic circuit. In the following, each unit configuring the printer image processing unit 110 is explained.

The job analysis unit 201 analyzes a print job received from the computer 114 via the network I/F 109. Then, the job analysis unit 201 obtains, for each drawing-target object, information on the attribute (text, graphics, image and the like), color values and the like thereof and generates RGB image data in the bitmap format, in which each pixel has color components in the RGB color space. The generated RGB image data is sent to the color/monochrome conversion unit 202 or the color conversion unit 203 along with attribute information indicating the object attribute.

The color/monochrome conversion unit 202 generates Gray image data for monochrome printing by converting RGB values of each pixel of the RGB image data into a Gray value using a predetermined conversion formula in a case where printing is performed in monochrome. Here, the Gray value is a color value not having the saturation component and has the same meaning as the K value in CMYK image data, to be described later. A specific example of color/monochrome conversion is explained in a case where RGB values of each pixel of the RGB image data that is input from the job analysis unit 201 are represented by eight bits (0 to 255). It is possible to find the Gray value as the output signal of the color/monochrome conversion by formula (1) below.

$$\text{Gray}=\alpha \times R+\beta \times G+\gamma \times B \quad \text{formula (1)}$$

In formula (1) described above, $\alpha$, $\beta$, and $\gamma$ are each a coefficient for the value of each channel of RGB and are values that satisfy formula (2) below.

$$\alpha+\beta+\gamma=1 \quad \text{formula (2)}$$

For example, in a case where the color gamut is in conformity to the sRGB standard, $\alpha$, $\beta$, and $\gamma$ are values, such as $\alpha=0.21$, $\beta=0.72$, and $\gamma=0.07$. The color/monochrome conversion unit 202 generates a Gray image in which each pixel has the Gray value by storing in advance the values of $\alpha$, $\beta$, and $\gamma$ as described above and performing the color/monochrome conversion for each pixel of the RGB image data that is input. Here, it is assumed that the RGB values of a certain pixel in the input RGB image are (238, 0, 0) representing dark red. The Gray value after the color/monochrome conversion in this case is 49.98≈50 from formula (1) described above and the above-described coefficient values. The conversion processing such as this is performed for each pixel of the input RGB image. The conversion formula is not limited to formula (1) described above and for example, it may also be possible to set a value obtained by dividing the sum of the R value, the G value, and the B value by "3" as the Gray value. Further, although details will be described later, in a case where monochrome printing in which the color characteristic of the destination device is reproduced is performed, the processing of the color/monochrome conversion unit 202 is not performed.

Figure 3:
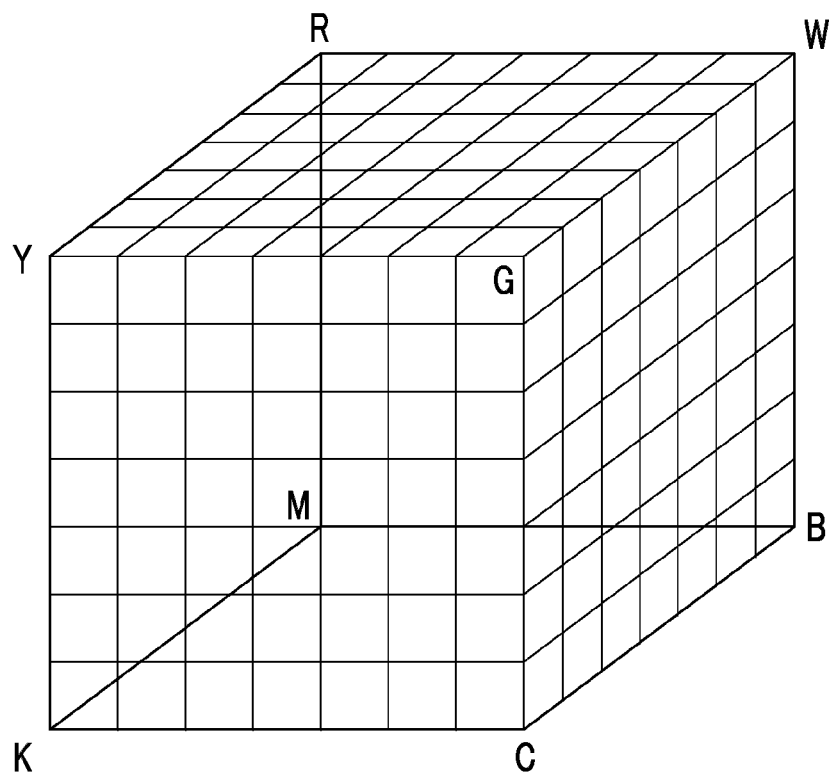
FIG. 3 is an explanatory diagram of a 3D-LUT.

The color conversion unit 203 converts RGB values of each pixel of the RGB image data into image data (CMYK image data) represented by the four color components in the CMYK color space in a case where printing is performed in color. For this conversion, a three-dimensional lookup table (3D-LUT) in which a predetermined number of input RGB values and output CMYK values are associated with each other is used. Here, with reference to FIG. 3, color conversion using a 3D-LUT is explained. Eight vertexes of a cubic in the three-dimensional color space shown in FIG. 3 correspond to R, G, B, Y, M, C, K, and W (white), respectively. In the 3D-LUT, CMYK values (output side) corresponding to each grid point arranged side by side at predetermined intervals specified by RGB values (input side) are stored as table data. By using this 3D-LUT, the output CMYK values corresponding to the input RGB values are found. At this time, in a case where a grid point corresponding to the input RGB values does not exist, CMYK values corresponding to the input RGB values are calculated by reading the CMYK values corresponding to the grid point of the RGB values close to the input RGB values and performing interpolation processing by using the read CMYK values. As the interpolation method, it may be possible to use a publicly known interpolation method, such as tetrahedral interpolation and cubic interpolation. It is also possible to switch the 3D-LUT to another for each object attribute based on attribute information attached to the RGB image data. As representative examples of a variation of the 3D-LUT, there are kinds as follows.

Tone prioritized . . . color conversion that gives importance to the tone characteristic of the monitor Minimum color difference . . . color conversion representing the color of the monitor accurately within the color reproduction range of the printer Saturation prioritized . . . color conversion that gives importance to the saturation of the printer Further, the color conversion unit 203 also performs processing to generate K image data by converting the RGB values of each pixel of the input RGB image data into a value having only the K component (that is, C=M=Y=0) in a case where monochrome printing in which the color characteristic of the destination device is reproduced is performed.

Figure 4A:
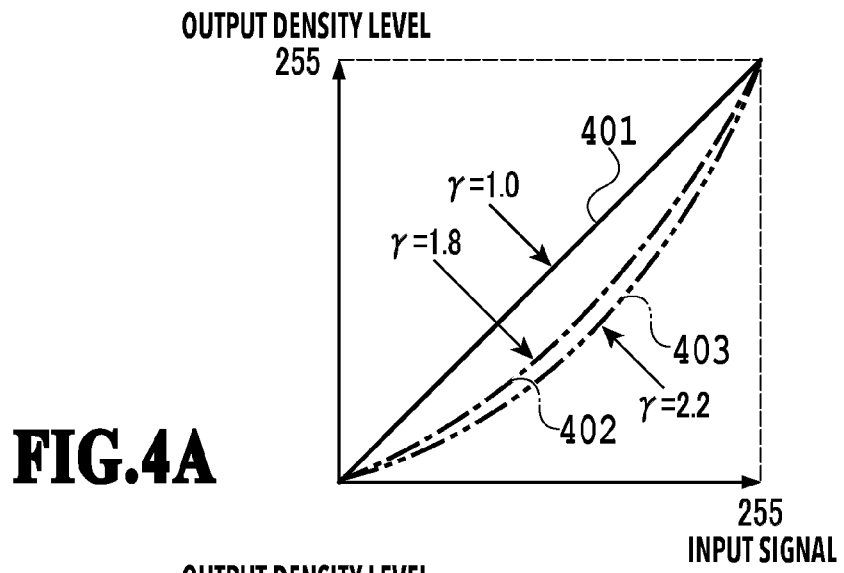
FIG. 4A to FIG. 4C are each an explanatory diagram of density correction using a 1D-LUT.
Figure 4B:
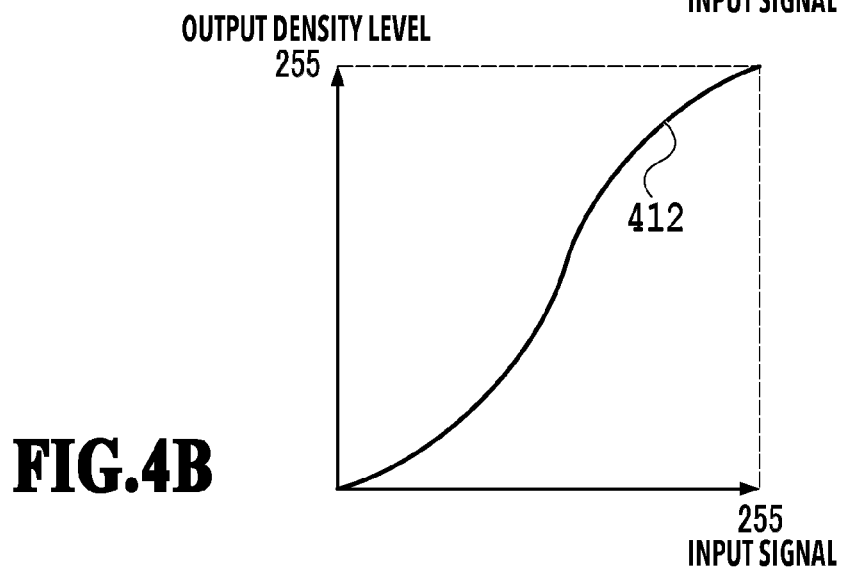
Figure 4C:
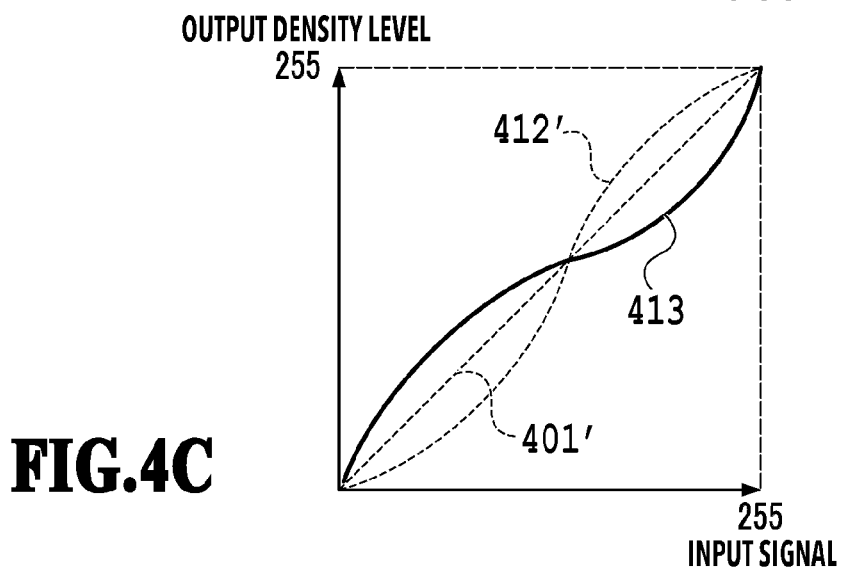

The density correction unit 204 performs correction processing for implementing a target density tone in the printer unit 111 for the CMYK image data or the K image data processed in the color conversion unit 203 or the Gray image data processed in the color/monochrome conversion unit 202. For this correction processing, a 1D-LUT is used. Here, the 1D-LUT for density correction is explained with reference to FIG. 4A to FIG. 4C. FIG. 4A shows three kinds of gamma characteristic specifying the target output density level for the pixel value (8-bit input signal value) of the input image data. In FIG. 4A, "γ=1.0" indicated by a solid line 401 is for text, "γ=1.8" indicated by a one-dot chain line 402 is for graphics, and "γ=2.2" indicated by a two-dot line 403 is for image. A solid line 412 in FIG. 4B indicates the density tone characteristic of the printer unit 111 in the state where the density correction is not performed. Here, in a case where the printer unit 111 has the density tone characteristic indicated by the solid line 412 in FIG. 4B and the linear characteristic of "γ=1.0" is taken as a target, a relationship between the input value and the output value in the 1D-LUT for implementing this is indicated by a solid line 413 in FIG. 4C. In FIG. 4C, a broken line 412' corresponds to the solid line 412 in FIG. 4B and a broken line 401' corresponds to the solid line 401 in FIG. 4A.

The quantization unit 205 performs quantization processing for the CMYK image data or the K image data processed in the density correction unit 204 or the Gray image data processed in the color/monochrome conversion unit 202. By the quantization processing, the image data is converted into N (positive integer)-bit halftone image data suitable to the printer unit 111. As the method of the quantization processing, there are a systematic dither method, an error diffusion method and the like and any method may be used.

The color conversion table generation unit 206 generates a 3D-LUT (in the following, called "color conversion LUT") as color conversion parameters for reproducing the color characteristic of the destination device in its own device as the adjustment device, in which the input RGB values and the output CMYK values are associated with each other. A rough procedure thereof is as follows. First, the color characteristic of the destination device is obtained by printing a density pattern chart (in the following, simply called "chart") including a plurality of patches from another device, which is the destination device. In this case, each patch on the chart corresponds to a specific density color and is arranged so that the color changes stepwise. Next, the color characteristic is obtained by printing the chart from its own device, which is the adjustment device. Then, based on both the obtained color characteristics, a color conversion LUT capable of reproducing the color characteristic of the destination device in the adjustment device is generated. The color conversion parameter is not limited to the format of a 3D-LUT. The color conversion table generation unit 206 of the present embodiment determines whether the chart print-output by the destination device is color or monochrome and in a case where determination results indicate that the chart is color, the color conversion table generation unit 206 generates a color conversion LUT for color printing and in a case where the chart is monochrome, generates a color conversion LUT for monochrome printing. Here, as the color conversion LUT for color printing, there exist two kinds, that is, a non-gray compensation type and a gray compensation type. In a case where a pixel whose pixel values satisfy R=G=B exists within the RGB image, the non-gray compensation type converts the pixel into a value represented in four colors of CMYK. On the other hand, in a case where a pixel whose pixel values satisfy R=G=B exists within the RGB image, the gray compensation type converts the pixel into a value represented in K color (that is, C=M=Y=0). The non-gray compensation type and the gray compensation type are used by being switched in accordance with the object attribute of a drawing target. For example, in a case of text and graphics, the gray compensation type is used and in a case of image, the non-gray compensation type is used. Due to this, for a text or graphics object, it is possible to obtain output results whose edge portion is sharp and for an image object, it is possible to obtain output results in which the balance between colors is achieved and whose color reproducibility is high. On the other hand, the color conversion LUT for monochrome printing converts all pixels configuring the RGB image into values represented in K color. In a case where it is desired to implement monochrome printing that reproduces the color characteristic of the destination device, this color conversion LUT for monochrome printing is used. Details of the color conversion table generation unit 206 will be described later.

The color conversion table storage unit 207 stores table data that is used at the time of converting an RGB image into a CMYK image (or K image) and provides the table data to the color conversion unit 203. In the table data that is stored, the default color conversion LUT created in advance is also included, in addition to the color conversion LUT generated for reproduction of the color characteristic of the destination device.

In the present embodiment, the color conversion table generation unit 206 is incorporated in a portion of the printer image processing unit 110, but it may also be possible to configure the color conversion table generation unit 206 as a processing unit different from the printer image processing unit 110 or as an image processing apparatus independent of the image forming apparatus 100.

Details of Color Conversion Table Generation Unit

Figure 5:
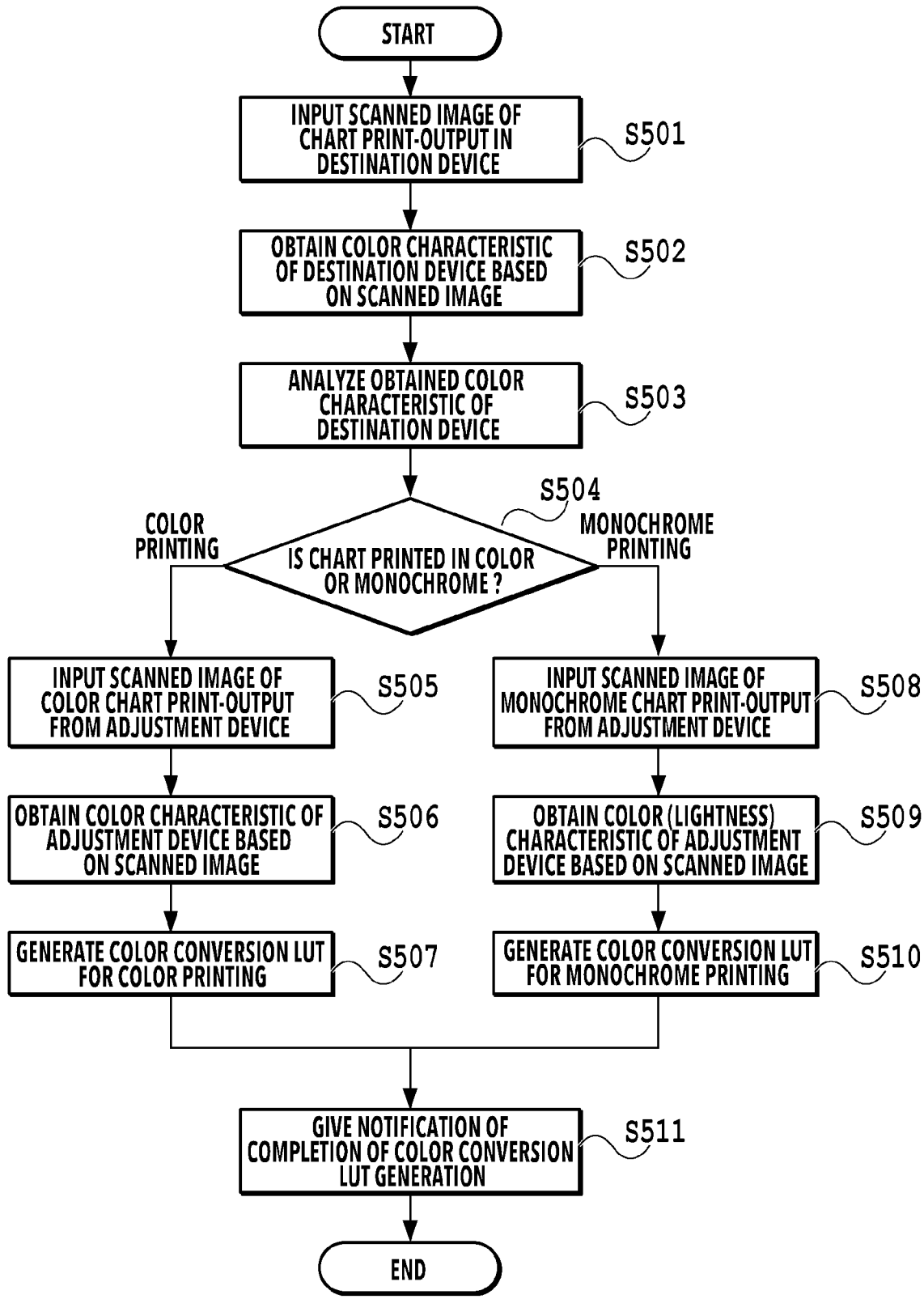
FIG. 5 is a flowchart showing a flow of processing to generate a 3D-LUT for reproducing a color characteristic of a destination device.

FIG. 5 is a flowchart showing a flow of processing to generate a color conversion LUT for reproducing the color characteristic of the destination device in the color conversion table generation unit 206. This flow is implemented by the CPU 101 loading a predetermined program from the ROM 102 onto the RAM 103 and executing the program. In the following explanation, symbol "S" represents a step.

Figure 6:
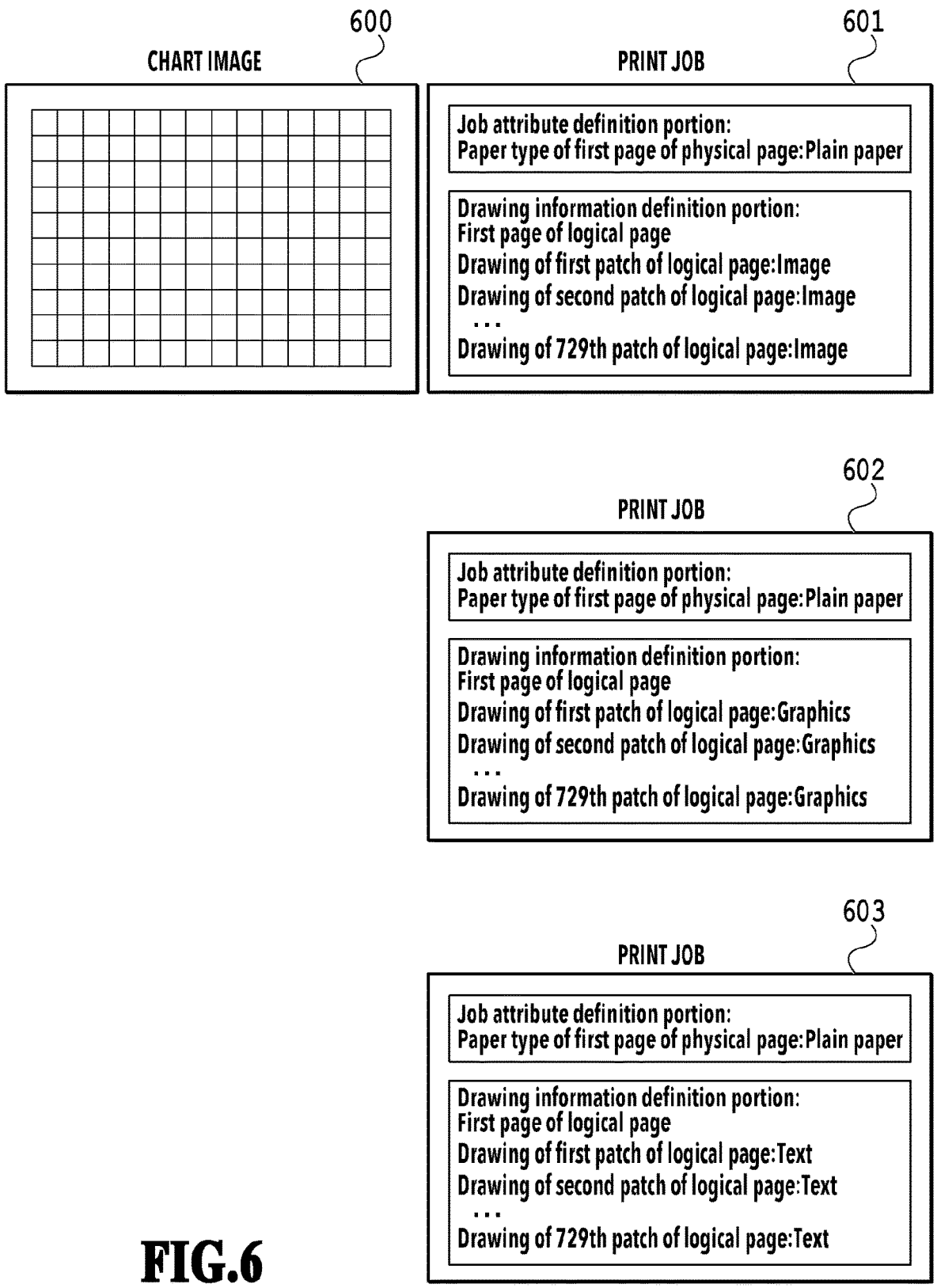
FIG. 6 is a schematic diagram showing a color chart image and print jobs thereof.

A user who performs color matching between the devices first outputs the chart from the destination device in color printing or monochrome printing. FIG. 6 is a schematic diagram showing a color chart image 600 consisting of patch areas in 9×9×9=729 colors and print jobs thereof. FIG. 7A shows an example of RGB values of each patch area of the color chart image 600. In the example in FIG. 7A, the RGB values for each patch (patch RGB values) are at intervals of 32 from (R, G, B)=(0, 0, 0) to (R, G, B)=(255, 255, 255). Then, in print jobs 601 to 603 for each object attribute, corresponding to the chart image 600, "Job attribute definition portion" and "Drawing information definition portion" exist (see FIG. 6). In Job attribute definition portion, the type (paper type) of the printing medium of the first page of the physical page is specified and in this example, "Plain paper" is specified. In a case where the chart continues across a plurality of pages, the paper type is specified also for the second and subsequent pages of the physical pages, but is desirable for the paper type to be common to pages. The physical page is a page for each printing medium (for each piece of paper) and one page of the physical page has the same meaning as that of one printing medium. In Drawing information definition portion, the drawing attribute of each patch is described for each logical page. Here, the logical page indicates an image that is formed on a memory space of the printing device and the image of the logical page is turned into a visible image by the printing device performing development processing using toner for the physical page. In a case of the print job 601 for the image attribute, each patch is represented in the bitmap format, such as JPEG and TIFF and in Drawing information definition portion, "Image" is described. In a case of the print job 602 for the graphics attribute, each patch is represented in the format of a rectangular drawing (rectangle is formed by designating coordinate position, width, and height) and in Drawing information definition portion, "Graphics" is described. In a case of the print job 603 for the text attribute, each patch is represented in the format of a character drawing (character is formed by designating shape, size and the like of the font) and in Drawing information definition portion, "Text" is described. In a case where the color conversion LUT that is applied in common to all the object attributes is generated instead of generating the dedicated color conversion LUT for each object attribute, for example, it is sufficient to output only the chart for the image attribute as a representative. In the destination device, in accordance with the print job, printing processing is performed after converting the RGB values corresponding to each patch within the chart image into CMYK values or a K value. The user having print-output the chart from the destination device in color or monochrome in this manner gives instructions to generate a color conversion LUT for color matching between the devices via a UI screen, not shown schematically. Together with this, the user sets the chart print-output from the destination device on a document table, not shown schematically, of the adjustment device and gives scan instructions. Due to this, scanned image data of the chart is generated and the series of processing shown in the flowchart in FIG. 5 is started.

First, at S501, the scanned image data of the chart print-output in the destination device is input. At next S502, the color characteristic of the destination device is obtained based on the scanned image data of the chart, which is obtained at S501. Specifically, the RGB values in each patch area on the scanned image are extracted and L*a*b* values corresponding to each patch area are obtained by referring to a table (3D-LUT) for converting the RGB values into the L*a*b* values, which is prepared separately. FIG. 7B shows RGB values obtained by reading each patch area on the scanned image in a case where the chart image in FIG. 6 is print-output in color and FIG. 7C shows converted L*a*b* values thereof. Further, FIG. 7D shows RGB values obtained by reading each patch area on the scanned image in a case where the chart image in FIG. 6 is print-output in monochrome and FIG. 7E shows converted L*a*b* values thereof. As shown in FIG. 7D, the case of monochrome printing is different from the case of color printing and the RGB values (scanned RGB values) of each patch on the scanned image satisfy R≈G≈B. The L*a*b* values of each patch, which are obtained as described above, are stored in the RAM 103 as information indicating the color characteristic of the destination device.

Figure 9:
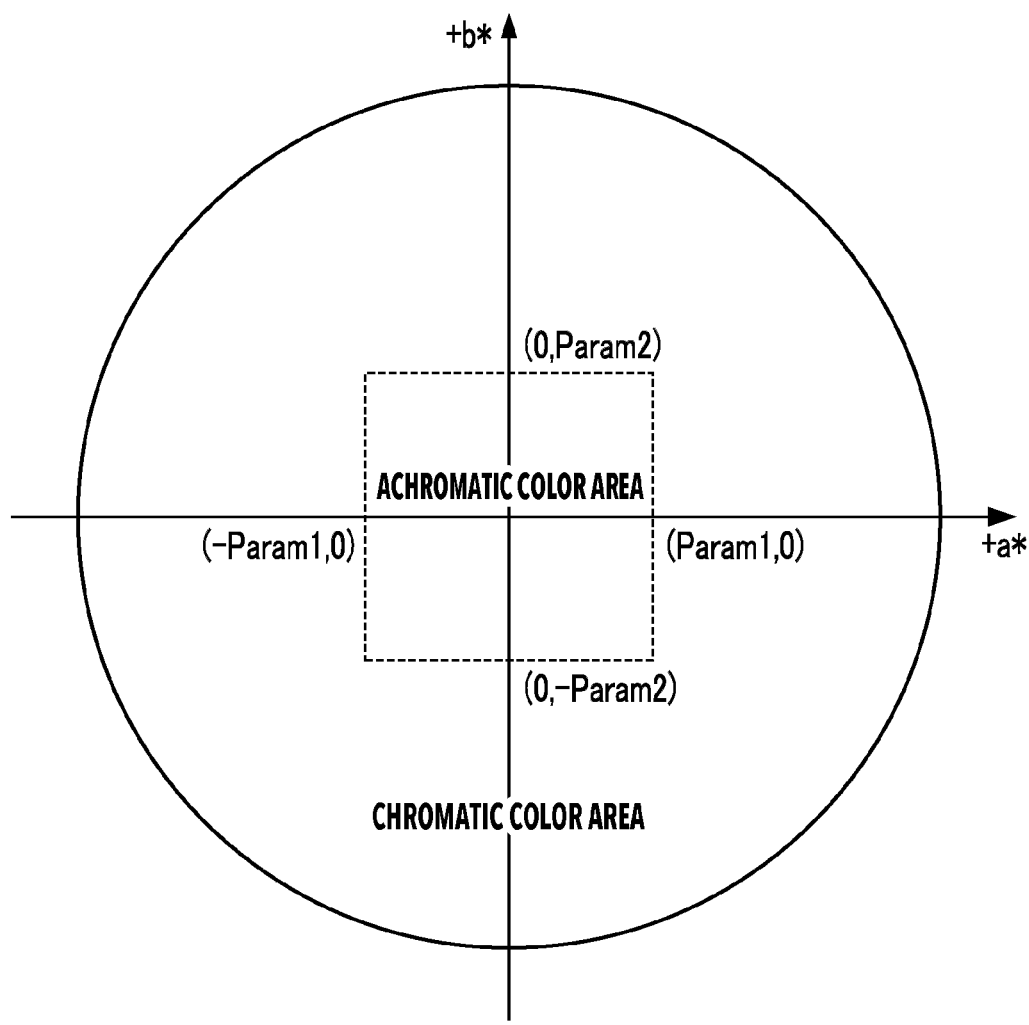
FIG. 9 is a diagram explaining a determination method of a chromatic color and an achromatic color.

At S503, the color characteristic obtained at S502 is analyzed and whether the chart that is print-output from the destination device is printed in color or printed in monochrome is determined. In this analysis of the color characteristic, whether the color represented by the L*a*b* values of each patch is a chromatic color or an achromatic color is determined based on the a* value and the b* value. Here, with reference to FIG. 9, a method of determining a chromatic color and an achromatic color is explained. FIG. 9 a diagram showing a relationship between the hue and the saturation in the L*a*b* color space and the direction toward the positive side of the a* axis indicates the red direction and the direction toward the negative side indicates the green direction, and the direction toward the positive side of the b* axis indicates the yellow direction and the direction toward the negative side indicates the blue direction. Then, in a case where the x-coordinates and y-coordinates of the boundary lines between the chromatic color area and the achromatic color area are defined as ±Param1 with respect to the a* axis and as ±Param2 with respect to the b* axis, the color of the L*a*b* values that satisfy formula (3) below is determined to be an achromatic color.

$$|a^*|<\text{Param1 and }|b^*|<\text{Param2} \qquad \text{formula (3)}$$

The color determination processing using formal (3) described above is performed for each of the L*a*b* values corresponding to each patch and in a case where all the L*a*b* values are included in the achromatic color area, it is determined that the chart print-output from the destination device is printed in monochrome. On the other hand, in a case where the L*a*b* values corresponding to at least one patch are included in the chromatic color area, it is determined that the chart print-output from the destination device is printed in color.

At S504, the processing is branched in accordance with the results of the chart determination processing at S503. Specifically, in a case where it is determined that the chart output from the destination device is printed in color, the processing advances to S505 and in a case where it is determined that the chart is printed in monochrome, the processing advances to S508. At this time, it may also be possible to display a message that prompts a user to print the chart from the adjustment device on the display unit 105, along with the results of the chart determination processing. In accordance with the results of the chart determination processing, a user print-outputs the color or monochrome chart from the adjustment device, sets the chart on a document table, not shown schematically, and gives scan instructions. In response to the scan instructions, the processing at S505 or S508 is started. In this situation, in a case where the color chart is printed, the chart image the same color as that of the chart image used in the destination device (that is, the chart image having the patch RGB values in FIG. 7A) is used. On the other hand, in a case where the monochrome chart is printed, the monochrome chart image having the patch RGB values that satisfy R=G=B is used. As shown in FIG. 8A, in the monochrome chart image, the RGB values of each patch are at intervals of 1 from (R, G, B)=(0, 0, 0) to (R, G, B)=(255, 255, 255) and the RGB values satisfy R=G=B. In a case where this monochrome chart image is printed, each patch is converted into an image represented in K color using a table for converting RGB into K (converting signal values of R=G=B into K color) and the image is output from the adjustment-target device.

At S505 in the case where the chart that is output from the destination device is printed in color, the scanned image data of the color chart that is output from the adjustment device is input.

At S506, as at S502, based on the scanned image data obtained at S505, the color characteristic of the adjustment device is obtained. Specifically, the RGB values in each patch area on the scanned image are extracted and L*a*b* values corresponding to each patch are obtained by referring to a table (3D-LUT) for converting the RGB values into the L*a*b* values, which is prepared separately. The L*a*b* values of each patch thus obtained are stored in the RAM 103 as information indicating the color characteristic of the adjustment device.

At S507, based on the color characteristic of the destination device, which is obtained at S502, and the color characteristic of the adjustment-target device, which is obtained at S506, a color conversion LUT for color printing, which is capable of reproducing the color characteristic of the destination device, is generated. A specific generation method is as follows. Here, the L*a*b* values (in the following, described as "L*a*b*1") of the destination device has already been obtained at S502, which corresponds to the patch RGB values (in the following, described as "RGB 1") of the chart image used at the time of printing the chart in color in the destination device. Then, the L*a*b* values (in the following, described as "L*a*b*2") of the adjustment device has already been obtained as well at S506, which corresponds to the patch RGB values (in the following, described as "RGB 2") of the color chart image used at the time of printing the chart in the adjustment device. Consequently, it is possible to find RGB 2 corresponding to arbitrary RGB 1 by searching for L*a*b*2 of the adjustment device, which match with L*a*b*1 of the destination device corresponding to RGB 1, and reversely calculating RGB 2 corresponding to L*a*b*2 that are found. Then, the processing such as this is performed for every RGB 1. There is a case where the range of the color (color gamut) that can be reproduced by the destination device is different from the range of the color that can be reproduced by the adjustment device. For example, in a case where certain L*a*b*1 of the destination device are outside the color gamut of the adjustment device, it is sufficient to replace the L*a*b*1 with L*a*b*2 of an approximate color within the color gamut of the adjustment device. This replacement processing is generally called gamut mapping and for example, there is a method of minimizing the color difference or the like. Then, a table in which RGB 1 and RGB 2 obtained as described above are associated with each other and a default 3D-LUT stored in advance for converting RGB into CMYK are combined. Due to this, a color conversion LUT for color printing for reproducing the color characteristic of the destination device in the adjustment device is obtained. As described previously, the color conversion LUT for converting RGB into CMYK includes the non-gray compensation type and the gray compensation type, and therefore, the combination processing is performed for each of the types. The combined color conversion LUT is stored in the color conversion table storage unit 207.

On the other hand, at S508 in the case where the chart that is output from the destination device is printed in monochrome, the scanned image data of the monochrome chart that is output from the adjustment device is input. At next S509, based on the scanned image data obtained at S508, the color characteristic of the adjustment device, in more detail, the characteristic of the lightness (L*) is obtained. Specifically, the L* value corresponding to each patch is obtained by extracting the RGB values in each patch area on the scanned image and referring to a table (3D-LUT) for converting the RGB values into the L*a*b* values, which is prepared separately. FIG. 8B shows the RGB values obtained by reading each patch area on the scanned image of the chart that is output in monochrome and FIG. 8C shows the L* value obtained by referring to the 3D-LUT. The L* value of each patch, which is obtained as described above, is stored in the RAM 103 as information indicating the lightness characteristic of the destination device.

At S510, based on the color characteristic of the destination device, which is obtained at S502, and the lightness characteristic of the adjustment-target device, which is obtained at S509, a color conversion LUT for monochrome printing, which is capable of reproducing the color characteristic of the destination device, is generated. A specific generation method is as follows. Here, the L* value (in the following, described as "L*1") of the destination device has already been obtained at S502, which corresponds to the patch RGB values (in the following, described as "RGB 1") of the chart image used at the time of printing the chart in monochrome in the destination device. Then, the L* value (in the following, described as "L*2") of the adjustment device has already been obtained as well at S509, which corresponds to the patch RGB values (in the following, described as "RGB 2") of the monochrome chart image used at the time of printing the chart in the adjustment device. Consequently, it is possible to find RGB 2 corresponding to arbitrary RGB 1 by searching for L*2 of the adjustment device, which matches with L*1 of the destination device corresponding to RGB 1, and reversely calculating RGB 2 corresponding to L*2 that is found. Then, the processing such as this is performed for every RGB 1. The gamut mapping is performed as needed and this is the same as that at S507. Then, by combining a table in which RGB 1 and RGB 2 obtained as described above are associated with each other and a default 3D-LUT stored in advance for converting RGB into K color, a color conversion LUT for monochrome printing for reproducing the color characteristic of the destination device in the adjustment device is obtained. The combined color conversion LUT is stored in the color conversion table storage unit 207.

The above is the contents of the processing to determine the color conversion LUT for reproducing the color characteristic of the destination device according to the present embodiment. In the above-described explanation, as the color conversion LUT for color printing, the two kinds, that is, the non-gray compensation type and the gray compensation type are created, but this is not limited. Further, as described previously, it may also be possible to obtain the color characteristic of the destination device for each attribute, such as image, graphics, and text, and generate the color conversion LUT for color printing (non-gray compensation type and gray compensation type) or the color conversion LUT for monochrome printing for each attribute. Furthermore, in the present embodiment, at the time of obtaining the color characteristic of the destination device or the adjustment device, the color value of the patch is obtained by reading the chart with the scanner, but for example, it may also be possible to obtain the color value by measuring the color of each patch area using a color measurement device.

Details of Printing Processing

Figure 10:
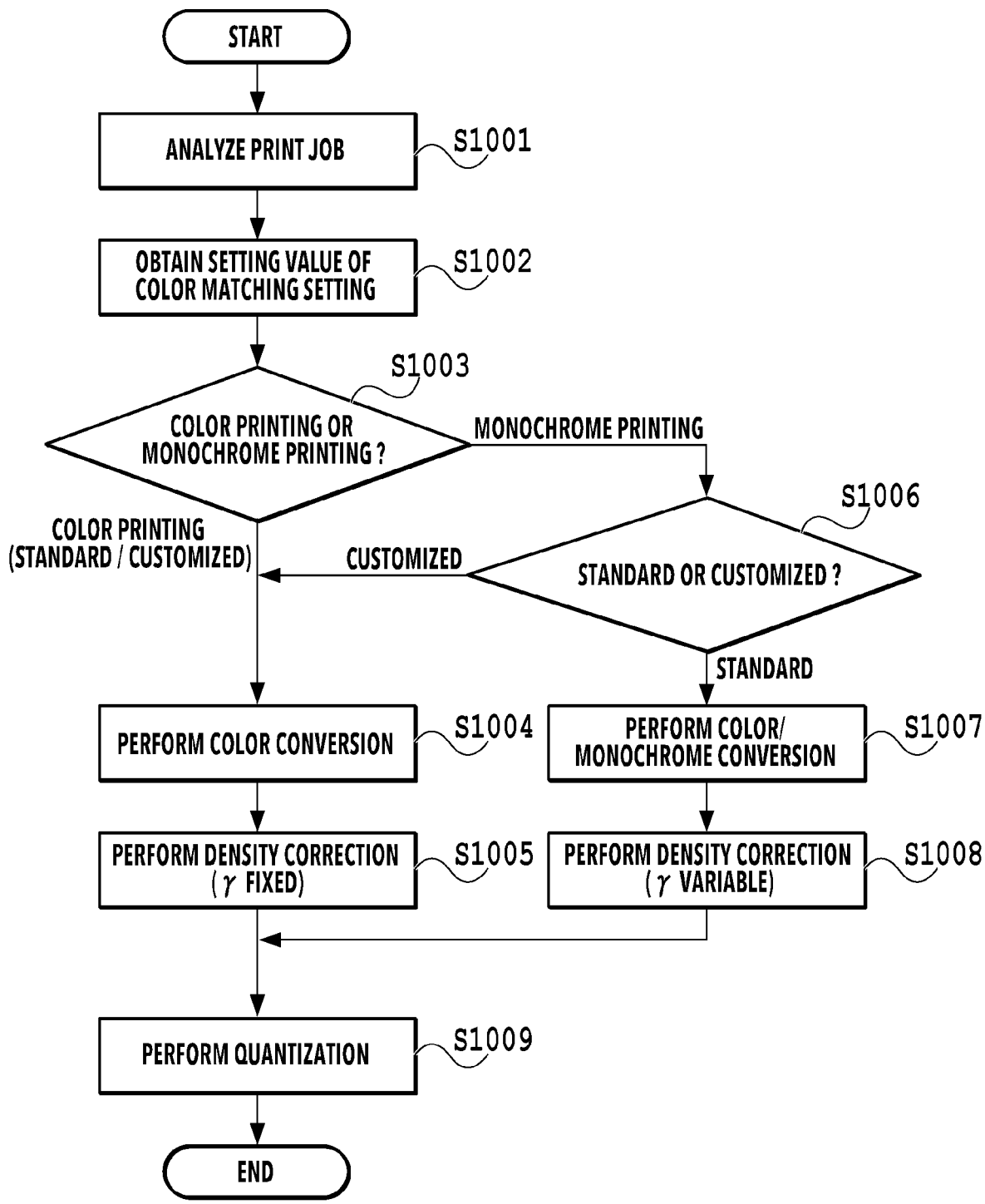
FIG. 10 is a flowchart showing a flow of a series of image processing in the printer image processing unit at the time of printing.

Following the above, the series of processing in the printer image processing unit 110 in a case where a print job of a general document is input is explained in detail. The feature of the present embodiment is that control to switch the conversion methods is performed in a case where normal monochrome printing (in the following, described as "standard monochrome") is performed and in a case where monochrome printing aimed at reproduction of the color characteristic of the destination device (in the following, described as "customized monochrome") is performed. Specifically, the control to switch the conversion methods is performed so that the color/monochrome conversion using a predetermined conversion formula is performed at the time of standard monochrome and the color conversion using a 3D-LUT is performed at the time of customized monochrome. The reason the switching control such as this is performed is that a smooth change in density is prioritized at the time of the standard monochrome and the reproduction of the color characteristic of the destination device is prioritized at the time of the customized monochrome. In the following, along the flowchart in FIG. 10, the flow of the series of image processing in the printer image processing unit 110 at the time of printing is explained. The series of processing shown in the flowchart in FIG. 10 is implemented by the CPU 101 loading a predetermined program from the ROM 102 onto the RAM 103 and executing the program. In the following explanation, symbol "S" means a step.

At S1001, the job analysis unit 201 analyzes the input print job and generates RGB image data that is the target of printing processing. At this time, information relating to the printing condition of whether printing is performed in color or monochrome, and attribute information on an object are also extracted.

Figure 11A:
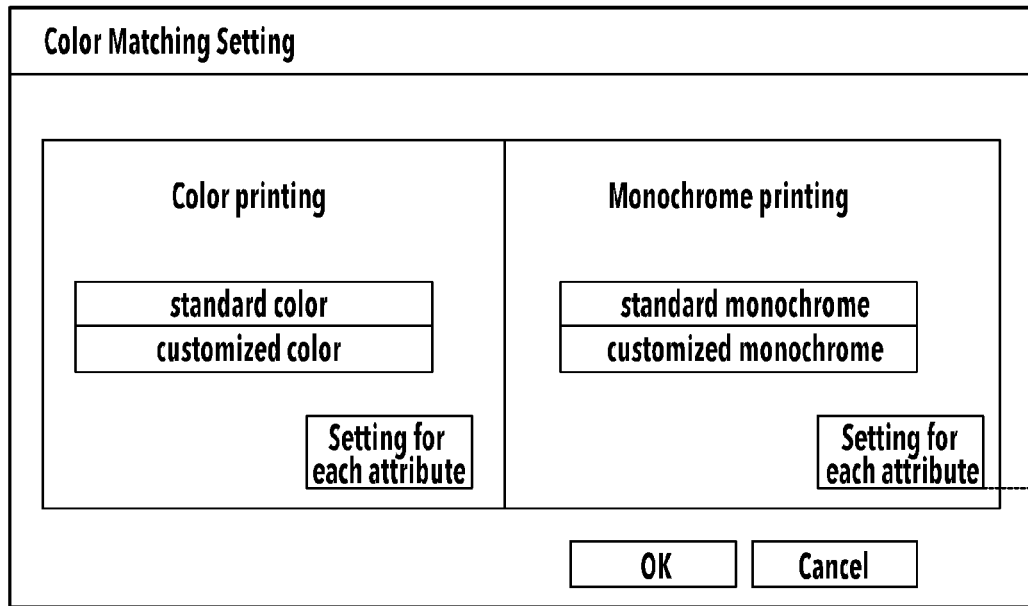
FIG. 11A and FIG. 11B are diagrams showing an example of a UI screen for color matching setting.
Figure 11B:
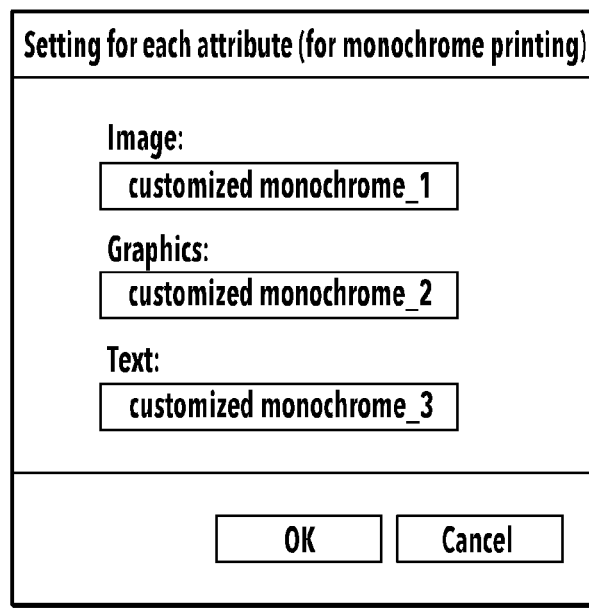

At S1002, based on the analysis results of the print job, the setting value of color matching is obtained. FIG. 11A is an example of a user interface screen (UI screen) for color matching setting and a user performs color matching setting in advance via the UI screen such as this displayed on the display unit 105. The UI screen shown in FIG. 11A is divided into an area for color printing and an area for monochrome printing and it is made possible to select two kinds of radio button for normal printing (standard) and for reproduction of the color characteristic of the destination device (customized), Then, it is made possible to perform setting different for each object attribute by pressing down a "Setting for each attribute" button existing respectively in a Color printing area 1101 and a Monochrome printing area 1102. FIG. 11B shows a sub screen that is displayed in a case where the "Setting for each attribute" button is pressed down in the state where "customized monochrome" is selected in the Monochrome printing area 1102 and it is made possible to perform setting for each attribute of image, graphics, and text. The contents of the color matching setting performed by a user in advance are obtained at this step. In a case where a user does not perform the color matching setting in advance, it is sufficient to obtain "standard color" or "standard monochrome" as a default setting value in accordance with the analysis results indicating color printing or monochrome printing.

At S1003, the processing is branched based on the information indicating whether printing is performed in color or monochrome, which is obtained by the job analysis at S1001. In a case where color printing is designated in the print job, the processing advances to S1004 and in a case where monochrome printing is designated, the processing advances to S1006. Then, at S1006, the processing is branched based on the setting value of color matching obtained at S1002. In a case where the obtained setting value is "standard monochrome", the processing advances to S1007 and in a case of "customized monochrome", the processing advances to S1004.

At S1004, the color conversion processing using a 3D-LUT is performed for the RGB data generated at S1001 by the color conversion unit 203 and in a case of color printing, CMYK image data is generated and in a case of monochrome printing, K image data is generated. For the color conversion processing, the color conversion LUT for color printing or monochrome printing associated with the setting value of color matching obtained at S1002 is used. In the following, explanation is given by dividing the case.

Case of Standard Color

In a case where the setting value of color matching is "standard color", the normal color conversion LUT for color printing (non-gray compensation type and gray compensation type) is obtained from the color conversion table storage unit 207 and color conversion is performed. Due to this, each of pixel values of the RGB image data is converted into CMYK values.

Case of Customized Color

In a case where the setting value of color matching is "customized color", the color conversion LUT for reproduction of the color characteristic of the destination device (non-gray compensation type and gray compensation type generated at S507 described previously) is obtained from the color conversion table storage unit 207 and color conversion is performed. Further, in a case of "customized color", on a condition that a user has performed "Setting for each attribute" described previously, the color conversion LUT corresponding to the setting value of each attribute is obtained and selectively applied in accordance with the object attribute. Due to this, each of pixel values of the RGB image data is converted into CMYK values.

Case of Customized Monochrome

In a case where the setting value of color matching is "customized monochrome", the color conversion LUT for monochrome printing for reproduction of the color characteristic of the destination device (table generated at S510 described previously) is obtained from the color conversion table storage unit 207 and color conversion is performed. Further, in a case of "customized monochrome", on a condition that a user has performed "Setting for each attribute" described previously and the color conversion LUT corresponding to the setting value of each attribute is stored in the color conversion table storage unit 207, those are obtained and applied selectively in accordance with the object attribute. For example, in the example in FIG. 11B described previously, each color conversion LUT associated with each of "customized monochrome_1", "customized monochrome_2", and "customized monochrome_3" is obtained and applied for each object of image, graphics, and text. Due to this, each of pixel values of the RGB image data is converted into a K value (C=M=Y=0).

At next S1005, by the density correction unit 204, density correction processing using a 1D-LUT is performed for the CMYK image data or the K image data obtained by the color conversion processing. At this time, the density correction processing is performed for the object of each attribute by applying a fixed gamma value (for example, γ=2.2 for image) in common. The reason the gamma value is fixed is that importance is given as much as possible to the nonlinear color conversion results using the color conversion LUT. The CMYK image data or the K image data for which the density correction has been performed is input to the quantization unit 205.

At S1007, by the color/monochrome conversion unit 202, the color/monochrome conversion processing using the conversion formula described previously is performed for the RGB data generated at S1001 and Gray image data is generated.

At S1008 that follows, by the density correction unit 204, the density correction processing using a 1D-LUT is performed for the Gray image data K image data) obtained by the color/monochrome conversion processing. At this time, the density correction processing is performed by applying a variable gamma value (see FIG. 4A described previously) for each object attribute. The reason the gamma value is made variable is to implement a smoother change in tone in accordance with the object attribute. The Gray image data for which the density correction has been performed is input to the quantization unit 205.

At S1009, by the quantization unit 205, the quantization processing is performed for the CMYK image data for which the density correction has been performed, which is input from the density correction unit 204, and halftone image data is generated.

The above is the flow of the image processing in the printer image processing unit 110. In the explanation described above, in a case where printing is performed in "standard monochrome", the color image is converted into the monochrome image by using the predetermined conversion formula, but it may also be possible to perform color conversion using a 3D-LUT. In this case, for the portion at which there is no grid point data corresponding to the input RGB values, the K value is calculated by interpolation processing, and therefore, K image data whose change in tone is more nonlinear that that by the method described previously is obtained.

As above, according to the present embodiment, whether the chart printed in the destination device is color or monochrome is determined and in accordance with the determination results, whether to generate the color conversion parameters for color printing or the color conversion parameters for monochrome printing is determined. Due to this, irrespective of whether the printed material is print-output in color or monochrome from the destination device, it is possible to perform appropriate color matching between the devices.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, irrespective of whether the printed material is print-output in color or monochrome from the destination device, it is possible to perform appropriate color matching between the devices.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-008033, filed Jan. 21, 2021 which is hereby incorporated by reference wherein in its entirety.

What is claimed is:
1. An image processing apparatus comprising:
a first determination unit configured to determine, based on reading results of a color of a printed material in which a predetermined density pattern is formed by a first image forming apparatus, whether the printed material is formed in color or monochrome; and a second determination unit configured to determine, based on a color characteristic of the first image forming apparatus derived based on the reading results and a color characteristic of a second image forming apparatus, color conversion parameters for reproducing the color characteristic of the first image forming apparatus in the second image forming apparatus, wherein the second determination unit determines the color conversion parameters for color printing in a case where the printed material is determined that formed in color by the first determination unit or determines the color conversion parameters for monochrome printing in a case where the printed material is determined that formed in monochrome by the first determination unit.

2. The image processing apparatus according to claim 1, wherein the predetermined density pattern includes a plurality of patches each of which corresponds to a specific density color and the first determination unit determines that:
 the printed material is formed in monochrome in a case where at least one color of colors corresponding to the plurality of patches relating to the color characteristic of the first image forming apparatus derived by reading the color corresponding to each of the plurality of patches is an achromatic color; and
 the printed material is formed in color in a case where none of all the colors corresponding to the plurality of patches relating to the color characteristic of the first image forming apparatus derived by reading the color corresponding to each of the plurality of patches is an achromatic color.

3. The image processing apparatus according to claim 2, wherein the first determination unit performs the determination of whether at least one color of the colors corresponding to the plurality of patches is an achromatic color based on an a* value and a b* value of L*a*b* values corresponding to the plurality of patches relating to the color characteristic of the first image forming apparatus.

4. The image processing apparatus according to claim 3, wherein the second determination unit determines:
 the color conversion parameters for color printing by using first L*a*b* values representing the color characteristic of the first image forming apparatus and second L*a*b* values representing the color characteristic of the second image forming apparatus in a case where the printed material is determined that formed in color by the first determination unit; and
 the color conversion parameters for monochrome printing by using a first L* value representing a lightness characteristic of the first L*a*b* values representing the color characteristic of the first image forming apparatus and a second L* value representing a lightness characteristic of the second L*a*b* values representing the color characteristic of the second image forming apparatus in a case where the printed material is determined that formed in monochrome by the first determination unit.

5. The image processing apparatus according to claim 1, wherein the second determination unit determines the color conversion parameters based on the color characteristic of the first image forming apparatus which is derived for each object attribute and the color characteristic of the second image forming apparatus which is derived for each object attribute.

6. The image processing apparatus according to claim 1, wherein the second determination unit determines a three-dimensional lookup table for converting color values in an RGB color space in printing-target image data into color values in a CMYK color space as the color conversion parameters.

7. The image processing apparatus according to claim 6, wherein as the three-dimensional lookup table for color printing, two kinds of non-gray compensation type and gray compensation type exist, the non-gray compensation type is a table representing a pixel in four colors of CMYK in a case where color values in the RGB color space satisfy R=G=B, and the gray-compensation type is a table representing a pixel in K color in a case where color values in the RGB color space satisfy R=G=B.

8. A printing apparatus as the second image forming apparatus comprising the first image processing apparatus according to claim 1, the printing apparatus comprising:

a user interface unit configured to set whether or not to perform printing aiming at reproduction of the color characteristic for color printing and monochrome printing separately;

a printing unit configured to perform printing processing in accordance with a print job;

a conversion unit configured to convert image data in an RGB color space, which is obtained by interpreting PDL included in the print job, into image data in a CMYK color space, which corresponds to color materials used for the printing processing; and a control unit configured to control a method of the conversion, wherein the control unit, in a case of performing monochrome printing:
 converts the image data in the RGB color space into K color image data by performing color conversion using color conversion parameters determined by the second determination unit in a case where setting to perform printing aiming at reproduction of the color characteristic of the first image forming apparatus is performed via the user interface unit; and
 converts the image data in the RGB color space into K color image data by using a predetermined conversion formula instead of performing color conversion using color conversion parameters determined by the second determination unit in a case where setting not to perform printing aimed at reproduction of the color characteristic of the first image forming apparatus is performed via the user interface unit.

9. The printing apparatus according to claim 8, wherein in a case where the image data in the RGB color space is converted into K color image data by using the predetermined conversion formula, density correction processing with a gamma value being made variable is further performed for the K color image data and in a case where the image data in the RGB color space is converted into K color image data by using the color conversion parameters for monochrome printing determined by the second determination unit, density correction processing with a gamma value being fixed is further performed for the K color image data.

10. An image processing method comprising:
a first determination step of determining, based on reading results of a color of a printed material in which a predetermined density pattern is formed by a first image forming apparatus, whether the printed material is formed in color or monochrome; and
a second determination step of determining, based on a color characteristic of the first image forming apparatus derived based on the reading results and a color characteristic of a second image forming apparatus, color conversion parameters for reproducing the color characteristic of the first image forming apparatus in the second image forming apparatus, wherein
at the second determination step, the color conversion parameters for color printing are determined in a case where the printed material is determined that formed in color at the first determination step or the color conversion parameters for monochrome printing are determined in a case where the printed material is determined that formed in monochrome at the first determination step.

11. A non-transitory computer-readable storage medium storing a program for causing a computer to perform an image processing method comprising:
a first determination step of determining, based on reading results of a color of a printed material in which a predetermined density pattern is formed by a first image forming apparatus, whether the printed material is formed in color or monochrome; and
a second determination step of determining, based on a color characteristic of the first image forming apparatus derived based on the reading results and a color characteristic of a second image forming apparatus, color conversion parameters for reproducing the color characteristic of the first image forming apparatus in the second image forming apparatus, wherein
at the second determination step, the color conversion parameters for color printing are determined in a case where the printed material is determined that formed in color at the first determination step or the color conversion parameters for monochrome printing are determined in a case where the printed material is determined that formed in monochrome at the first determination step.

* * * * *